United States Patent [19]

Berstein

[11] Patent Number: 5,333,480
[45] Date of Patent: Aug. 2, 1994

[54] METHOD FOR STRAIGHTENING OUT OF TRUE WORK PIECES, ESPECIALLY CRANKSHAFTS

[75] Inventor: Garri Berstein, Erkelenz, Fed. Rep. of Germany

[73] Assignee: W. Hegenscheidt Gesellschaft mbH, Erkelenz, Fed. Rep. of Germany

[21] Appl. No.: 96,677

[22] Filed: Jul. 23, 1993

Related U.S. Application Data

[63] Continuation-in-part of Ser. No. 826,651, Jan. 22, 1992, Pat. No. 5,235,838, which is a continuation of Ser. No. 594,829, Oct. 9, 1990, abandoned, which is a continuation of Ser. No. 217,552, Jul. 11, 1988, Pat. No. 5,001,917.

[30] Foreign Application Priority Data

Jul. 13, 1987 [DE] Fed. Rep. of Germany .... 3723097.2
Sep. 24, 1987 [EP] European Pat. Off. ........ 87113938.2

[51] Int. Cl.$^5$ ........................... B21H 7/00; B21D 3/16
[52] U.S. Cl. ......................................... 72/110; 72/73; 72/74
[58] Field of Search .................... 72/110, 342, 10, 73, 72/74

[56] References Cited

U.S. PATENT DOCUMENTS

| | | | |
|---|---|---|---|
| 4,416,130 | 11/1983 | Judge, Jr. | 72/10 |
| 4,561,276 | 12/1985 | Berstein | 72/110 |
| 4,860,566 | 8/1989 | Augustin | 72/110 |
| 5,001,917 | 3/1991 | Berstein | 72/110 |
| 5,235,838 | 8/1993 | Berstein | 72/110 |

FOREIGN PATENT DOCUMENTS

| | | | |
|---|---|---|---|
| 59-101228 | 6/1984 | Japan | 72/110 |
| 730550 | 4/1980 | U.S.S.R. | 72/110 |
| 957711 | 5/1964 | United Kingdom | 72/110 |
| 957805 | 5/1964 | United Kingdom | 72/110 |
| 1004962 | 9/1965 | United Kingdom | 72/110 |

*Primary Examiner*—Lowell A. Larson
*Assistant Examiner*—Donald M. Gurley
*Attorney, Agent, or Firm*—W. G. Fasse; W. F. Fasse

[57] ABSTRACT

A truing operation for straightening out of true work pieces such as crankshafts, must not again reduce the fatigue strength of the work piece achieved in a previous strengthening operation. This is achieved by a truing operation, wherein locally bounded compressive residual stresses are induced in a surface layer zone of the work piece by a hardening operation, whereby the respective out of true deformation of the work piece is at least reduced. The truing operation is repeated until the out of true deformation is eliminated. The compressive residual stresses are induced in a surface layer zone of the work piece by a locally limited hardening operation, e.g. a surface strengthening rolling operation. By appropriately varying the extent of hardening or the rolling force respectively, any out of true deformation may be even completely eliminated. A machine for performing the method is also disclosed.

20 Claims, 5 Drawing Sheets

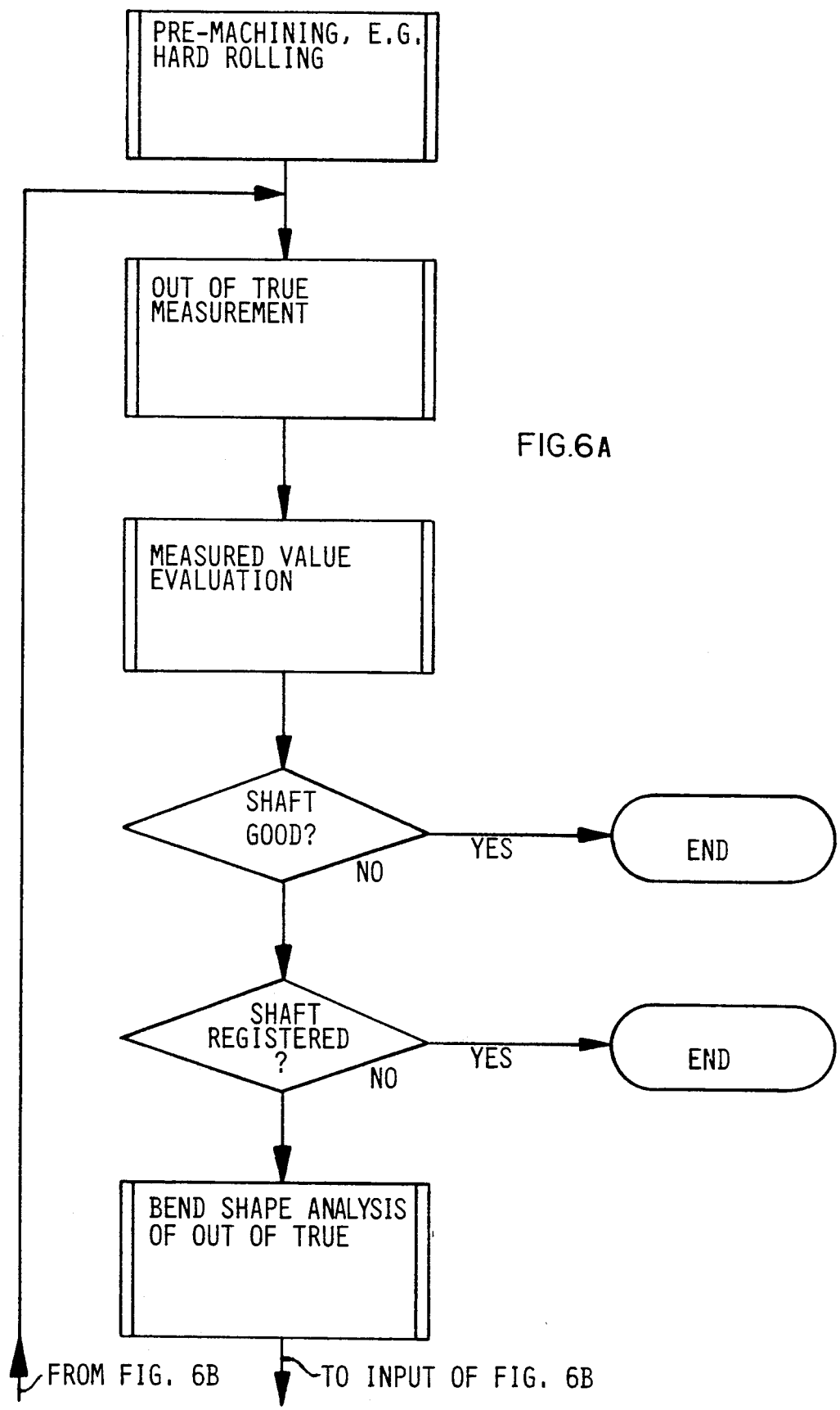

METHOD FOR STRAIGHTENING OUT OF TRUE WORK PIECES, ESPECIALLY CRANKSHAFTS

The present application is a continuation-in-part of application of U.S. Ser. No.: 07/826,651, filed on Jan. 22, 1992, now U.S. Pat. No. 5,235,838, which in turn is a File Wrapper Continuing application of U.S. Ser. No.: 07/594,829 filed on Oct. 9, 1990, (abandoned), which was a continuation of application of U.S. Ser. No.: 07/217,552, filed Jul. 11, 1988, now U.S. Pat. No. 5,001,917, issued: Mar. 26, 1991.

FIELD OF THE INVENTION

The invention relates to a method for straightening work pieces which are bent or out of true. An apparatus for carrying out the present method is also described.

DESCRIPTION OF THE PRIOR ART

Methods for straightening or truing structural components or machine parts which are bent or out of true, are generally known. Prior methods treat components or work pieces which are bent in one direction and hence require straightening or truing, by means of an appropriate back-bending in the other direction. In order to achieve this, the work piece is normally supported on two supports and then a sufficiently great force is applied to the work piece in the area of its greatest bending deformation between the two supports, whereby the force is applied in a radial direction opposite to the bending direction until the corresponding elastic deformation range is exceeded and a plastic deformation is caused. The result of such a straightening operation is then measured and the straightening operation is repeated if necessary at the same location or at another location and perhaps with a different applied bending force until the work piece has been sufficiently straightened.

The above mentioned conventional method of straightening work pieces has several disadvantages. One important disadvantage is seen in that such a straightening operation is undesirable due to detrimetal effects on the internal stress pattern of the work piece, which stress pattern results in a reduced mechanical strength and/or a reduced fatigue strength limit.

Especially work pieces or components which will be subjected to a dynamic loading, may not be straightened in a truing operation which reduces the respective fatigue strength of the work piece. Otherwise, the dimensions of the work piece must be correspondingly increased to achieve the required final fatigue strength. It is often not possible to increase the dimensions of a work piece to achieve a higher strength and in any event, such an increase in dimensions leads to an uneconomical production. The above described state of the art straightening method has an especially negative effect on work pieces which have previously been treated to increase their fatigue strength. Usually, the above described straightening method completely negates the increased fatigue strength which had been achieved in the work piece, for example by a prior deep rolling operation.

It has been a problem of longstanding how to avoid disturbing or even again eliminating from a work piece a previously produced good fatigue strength introduced, for example, by a fatigue strength improving operation, e.g. deep rolling around 360° of the work piece circumference, when the work piece must be straightened after the fatigue strength improving operation. Straightening prior to the fatigue strength improving operation is not feasible because a fatigue strength improving operation may itself introduce a bend into the work piece depending on an initial stress distribution in the work piece.

U.S. Pat. No. 4,416,130 (Judge, Jr.), issued on Nov. 22, 1983 discloses a pulsing impact straightener, which uses peening tools that are intended to introduce compressive straightening forces in the shaft to be straightened while the shaft is continuously rotating. The peening does cause a stress relief in the shaft and distributes compressive straightening forces over the length of the shaft "to maximize the range of effective straightening capacity". Judge, Jr. aims at achieving that "all resulting surface stresses are compressive, both where fibers are elongated through peening to eliminate concave curvature and the opposite side where fibers are compressed to eliminate convex curvature, . . . ". However, the above mentioned stress relief cannot be completely avoided by peening. Hence, any initially introduced fatigue strength improving stresses are reduced again by the peening at least to some extent, which is undesirable. Further, Judge, Jr. does not limit his peening operation to any particular angular range.

British Patent 957,805 (Cox et al.) discloses a crankshaft straightening method and apparatus and uses the angular position and the amplitude of the "eccentricity" or bend in the shaft to provide a control signal for the operation of straightening tools comprising clamps 6 which reach around the crankshaft from opposite sides and carry slanted rolling tools (38) and back-up rollers (39). The pressure exerted on the rolling tools varies cyclically in synchronism with the relative rotation of the crankshaft to produce an opposite distortion in the appropriate direction. An "opposite distortion" tends to eliminate at least partly compressive stresses previously introduced into the crankshaft for improving the fatigue strength. Thus, Cox et al. leave room for improvement.

British Patent 1,004,962 (Wright et al.) discloses a method and apparatus for straightening crankshafts. Wright et al. clearly recognizes the problem of conventional straightening methods, when they state "that correction methods of this character reduce the fatigue strength of the crankshaft by the introduction of zones of tensile stress of appreciable magnitude into certain fillet regions". Thus, Wright et al. aim at correcting crankshafts without reducing the fatigue strength and to improve the fatigue strength. However, the use of an "indenter" as disclosed by Wright et al. does not quite succeed in avoiding fatigue strength reduction because the indenter encircles simultaneously at least 90° of the fillet circumference. Such a large encirclement requires substantial straightening forces to be applied to the indenter. Tests with a tool quite similar to the indenter of Wright et al. have shown that a precise stress distribution control is impossible for all practical purposes when the indenter encircles such a large circumferential angle simultaneously. As a result of the tests, it was found that an indenter does not leave the fatigue strength improving stresses in a crankshaft undisturbed when the indenter is used for straightening a crankshaft. Further, Wright et al. teach applying the indenters to all the crankpin and main journal fillets of a crankshaft, not merely to those necessary for realignment. As a result, a precise control of the stress distribution in the crankshaft in fine incremental steps is not possible by the Wright et al. method and apparatus. Further, due to the large surface area contact between the work piece and the indenter of Wright et al., the forces needed for the straightening are undesirably large, e.g. four times as large compared to a rolling operation.

OBJECTS OF THE INVENTION

In view of the foregoing it is the aim of the invention to achieve the following objects singly or in combination:

to simplify and improve the results of a method for straightening or truing work pieces;

to avoid reducing the fatigue strength of a work piece straightened or trued according to the present method;

to avoid cancelling or negating the effects of a fatigue strength improving pretreatment which increased the fatigue strength of a work piece prior to being straightened by the present method;

to cause compressive residual stresses in specified, bounded areas of a surface layer in order to effectively and accurately straighten an out of true work piece;

to make sure that the forces needed for the truing are applied where they are most effective for the intended purpose;

to precisely control the introduction of fatigue strength improving stresses and straightening stresses into a crankshaft by applying these required forces at any one instant to a point or small contact area between a rolling tool and the work piece and to also limit the angular range around which the straightening forces are applied to the work piece as the contact point or small contact area travels along the limited angular range;

to limit the effectiveness of the residual compressive stresses required for the straightening to a limited angular circumferential range and to a limited radial depth into the work piece around the work piece as determined by a control signal;

to perform a fatigue strength improving rolling operation and a straightening rolling operation in sequence on the same machine tool without removing the work piece from the machine tool;

to make sure that any and all residual stresses remaining in the work piece after a fatigue strength improving rolling operation and after a following straightening rolling operation are exclusively residual compressive stresses and no residual tensile stresses remain in the work piece in the surface layer of the surface;

to make sure that any residual compressive stresses introduced into the work piece for the straightening are exclusive additive relative to residual compressive stresses introduced for fatigue strength improvement; and to minimize the forces needed for a straightening operation.

SUMMARY OF THE INVENTION

A method for straightening a work piece having cross-sections along its length with fillets forming transition areas between neighboring cross-sections, said cross-sections having a work piece diameter D1, said work piece having a rotational axis and a bend relative to said rotational axis, said bend being determined by three values, namely as to its location by an axial coordinate value, as to its direction by an angular coordinate value, and as to its size by an eccentricity magnitude value, comprising the following steps:

(a) first introducing into said fillets of said work piece first residual compressive stresses in a complete circumferential surface layer for increasing a fatigue strength of said work piece, (b) determining from said three values a respective control signal which represents a circumferentially limited angular range $\beta 1$ within about 5° to about 160° around a portion of at least one of said fillets requiring the introduction of further residual compressive stress for said straightening, and (c) second introducing additive second residual compressive stresses in response to said control signal, for adding said second residual compressive stresses to said first residual compressive stresses only in said range $\beta 1$ of said surface layer zone, by a rolling tool having a diameter D2 substantially smaller than said work piece diameter D1 by applying to said rolling tool a straightening force only in said limited angular range $\beta 1$ of said surface layer zone of said at least one fillet to introduce said second additive residual compressive stresses only to a radial depth D3 short of a depth where said second residual compressive stresses tend to become subtractive, for increasing said first residual compressive stresses by said second residual compressive stresses only in said limited angular range $\beta 1$ of said surface layer, thereby avoiding reducing said fatigue strength and simultaneously reducing or eliminating said bend.

When the compressive residual stresses are induced in the material of the work piece, it must be assured that these stresses do not extend through the entire grain structure, but rather that they arise to any considerable extent only in a surface layer zone of the work piece. The radial depth D3 of the compressive stresses for the straightening must not exceed about 1.0 mm in the radial direction. A radial stress depth of about 0.1 to 0.5 mm has been found to be quite effective, and 0.3 mm is preferred. Generally, the limit of the radial depth D3 or stress penetration is given by a depth where a reduction of the beneficial effects of the prior deep rolling for fatigue strength increase begins. Thus, the depth D3 is always shorter than the just mentioned reduction depth where the beneficial effects of a fatigue strength improvement and a work piece straightening start cancelling each other.

The induced compressive residual stresses cause a corresponding deformation of the work piece. The direction of this deformation depends, among other factors, on the fact to which specific surface area of the work piece the forces for inducing compressive residual stresses have been applied. The deformation magnitude or straightening magnitude of the work piece is dependent on how strong the compressive residual stresses are and how deep the compressive residual stresses reach into the surface layer zone. In order to achieve a desired straightening or truing effect, the compressive residual stresses must be induced in the work piece in a defined locally bounded area. This may be achieved, for example, by a locally limited deep rolling operation. In these operations, it is not critical how the local limiting or bounding of the strengthening effect is achieved only that it is limited to the proper area and radial depth. For example, for work pieces having a rotational axis it is possible to harden the work piece within a defined axial limit, but around the entire circumference within such axial limit, and to a necessary hardening depth so as to achieve the selected hardness. This effect could also be achieved by deep rolling with a selected specific rolling force. In the case of such a deep rolling operation, a further possibility for precisely controlling the hardening results, is given by varying the number of rolling passes. One to ten, preferably five rolling passes, have been found to be adequate for an effective straightening.

The deep rolling for straightening is performed through an angular range of 5° to 160°, preferably 75° to 105°, while the deep rolling for increasing the fatigue strength takes place through a full 360° rotation. Preferably, both operations are performed substantially simultaneously, that is sequentially, relative to the work piece rotation in that the rolling force is increased for the time duration when the limited angular range of the work piece surface is contacted by the rolling tool. Within this limited angular range $\beta 1$ the fatigue strength improving rolling and the straightening rolling preferably do take place simultaneously. The diameter D2 of the rolling tool must be substantially smaller than the diameter D1 of the work piece, D2 to D1 should be preferably within the range of (0.25 to 0.35) D1.

The rolling force should be within the range of 500 to 2000 Kp, preferably 800 to 1600 Kp (kilopond). These roller dimensions and rolling forces avoid a plastic deformation of the work piece. The larger the additional compressive residual stresses, the smaller will be the above mentioned limited angular range $\beta 1$ and vice versa.

For any work pieces which have cross-sectional area transitions and especially for work pieces additionally having a rotational axis, a notch effect may arise at the edges of the transitions. In such cases it is advantageous to carry out a hardening of the surface layer zone of the work piece for inducing compressive residual stresses in the notch region of the respective transitions. Typical examples of work pieces having cross-sectional transitions include the transitional concave fillets of axle journals steering knuckles, crank shafts or cam shafts or other similar work pieces. It is quite simple and favorable to harden or deep roll these areas. Furthermore, it is also quite simple to carry out a hardening or deep rolling operation for inducing compressive residual stresses in the area of the concave fillet over an angular range smaller than the entire circumference of the concave fillet. The appropriate limited angular range should, however, be at least 10°.

For relatively simple, and for example, rotationally symmetric work pieces such as, for example, stepped shafts, it is to be expected that if compressive residual stresses are induced over a limited circumferential angular range in-the area of a shoulder or notch, for example in the area of a transition concave fillet, in such a manner that the residual stress also arises in the two neighboring work piece zones, the corresponding deformation reaction of the work piece also arises in the plane in which the angle bisector of the circumferential angular range lies over which the compressive residual stresses were induced.

For a more complex component, such as a crankshaft, the size, shape, and position of neighboring elements of the crank shaft, such as, a crank web, may additionally influence the deformation direction of a deformation which is caused by inducing the compressive residual stresses as described above. However, such effects may easily be empirically determined, so that it is always possible to induce or cause the compressive residual stresses, or to increase the original compressive residual stress in such a circumferential sector that an intended deformation of the neighboring work piece regions is achieved. Thus, the original out of true deformation and the purposely applied straightening deformation have such directions that a vectorial addition of the two deformations results at least in a smaller "out of true" or bend in the work piece. The straightening or truing out of true work pieces by inducing compressive residual stresses in the work piece at appropriate locations for achieving the desired straightening effect may also effectively be used if the work piece to be straightened has already been prehardened. However, in such a case it is necessary to achieve higher compressive residual stresses and/or a deeper surface layer zone affected by the compressive residual stresses relative to the previously existing hardening of the work piece. For example it is possible to use.a deep rolling operation for straightening a work piece which has previously been deep rolled in order to increase its fatigue strength, provided that the straightening rolling operation is carried out at a higher specific rolling force than that of the previous deep rolling operation or, alternatively, with the same specific rolling force, but a higher absolute rolling force. Even with an increased specific rolling force, it is possible to avoid that the resulting compressive residual stresses penetrate to a greater depth than necessary for the straightening by properly arranging the rolling roller. Instead, it is the aim of the invention to increase the compressive residual stresses which already exist in the surface layer zone. This may be achieved, for example, with a deep rolling roller having a smaller diameter than the deep rolling roller used in the original deep rolling operation. According to so-called Hertzian compression or Hertzian stress rules, the specific rolling force applied to the work piece is increased while the same absolute rolling force is applied to the roller. If the reduction of the diameter of the rolling roller by itself is not sufficient to increase the specific rolling force as desired, then the absolute rolling force may additionally be increased.

Alternatively, when the diameter of the rolling roller is increased, a reduced Hertzian compression or stress and hence a reduced specific rolling force is applied to the work piece. By increasing the absolute rolling force the same specific rolling force can again be achieved which was also originally applied with a smaller roller in the previous deep rolling operation. Thus, it is achieved that the compressive residual stresses in the surface layer zone are increased extending deeper into the surface layer zone. In this context, it is respectively irrelevant whether the strengthening operation for increasing the fatigue strength of the work piece was carried out prior to the straightening operation or instead simultaneously with the straightening operation. It is simply necessary to view the specific power or force data of the respective measures applied for increasing the fatigue strength of the work piece as a starting point for then varying these force data as necessary to induce the desired locally bounded increased compressive residual stresses.

If a deep rolling operation is carried out, for example, in the area of a transition concave fillet of an axle journal in order to increase the fatigue strength of the axle journal and it is determined that the axle journal is out of true or has a deformation of a determined size and in a determined direction, then it is possible, for example, to increase the rolling force by a necessary amount over the previously applied rolling force during the rolling operation at an appropriate or corresponding location for achieving the desired effect. This force increase is only necessary over a portion or a certain circumferential angle in the circumferential direction. Thereafter, the force is again reduced to the value determined for achieving the desired fatigue strength. Analogous considerations hold true for a hardening operation of, for example, an axle spindle bolt or steering knuckle pin.

The straightening method according to the invention is especially advantageously applicable to mass production of a large number of identical work pieces. For example, in the mass production of a specific crankshaft, it might be determined, that the various successive machining or manufacturing steps for producing the crankshaft result in an undesirable bend or out of true deviation in a specific direction and with a specific magnitude. In such mass production the magnitude and direction of any resulting out of true deviation of the work piece will remain essentially constant for a whole series of identical work pieces. It is then quite a simple matter to determine by appropriate experiments or tests during the start up of a mass production series, at which locations and to what magnitudes compressive residual stresses must be induced in the work piece in order to achieve the desired straightening effect in the work piece, such as a crankshaft. Once the data necessary for controlling the induction of compressive residual stresses are established, these data may be stored as a fixed program and may then be carried out repeatedly by an appropriate apparatus. In this context, any necessary equipment may then be especially simple in construction, because in this case the apparatus is not required to include appropriate testing means and measuring means for determining the actual shape of the crankshaft. Furthermore, separate means for monitoring or checking the respective results of the straightening operation are also no longer required. Random sampling testing is completely sufficient for monitoring or controlling the results of the straightening operation according to the invention.

In order to carry out the straightening operation in general, at least one measurement operation must be carried out on the work piece in order to determine the location, magnitude and direction of any out of true deviation of the work piece. Then the straightening operation is carried out dependent upon the data determined in the above mentioned measurement operation. For crankshafts, the angular range over which the compressive residual stresses are to be introduced in the circumferential direction of a notch region, for example, a transition concave fillet, is determined at the main bearings and/or the connecting rod bearings.

After the straightening operation has been carried out a first time or in a first pass, the result of this first straightening pass may be determined and, if necessary, a further straightening may be carried out with appropriately adjusted straightening data. In this context, "adjusted straightening data" means that several factors may be respectively varied as needed singly or in combination including the specific rolling force, the absolute rolling force, the number of rolling passes or the rotational angular position of the effective direction of the rolling force, or the axial position of the effective location of the rolling force. Analogous considerations apply where the necessary compressive residual stresses are induced by means of a hardening operation. The respective magnitudes of the desired adjustments or changes may be prescribed in a fixed manner, so that constant adjustment steps are carried out. However, it is alternatively possible, to make the type and magnitude of a necessary adjustment dependent on the results of the previous straightening operation. In order to achieve this, a corresponding apparatus must be provided with an appropriate deformation measuring system. Then a computer cooperating with the apparatus can determine the parameters of the next straightening operation based on the results of a previous straightening operation in a step by step manner. The computer generated straightening parameters are then input to an appropriate machine control.

In the straightening method according to the invention, especially when applied to essentially cylindrical lengthwise extending work pieces, it is suggested, that compressive residual stresses are induced in the work piece surface opposite the out of true bending direction, that is to say, on the inside surface of an out of true bend, for example, by means of a rolling operation. This rolling operation may be carried out as a plunge type rolling operation or as a feed advance rolling operation.

According to the invention crankshafts are very effectively straightened or trued. In this context, it is especially advantageous, if the out of true deformation of the crankshaft to be straightened is measured at several locations and then the straightening operation is first carried out in the area having the largest deformation.

For carrying out the method according to the invention, the present apparatus of the invention includes at least one work piece clamping device arranged on a machine base. The present apparatus further has several additional components including some type of means for applying the forces that will induce the required compressive residual stresses in a surface layer zone of the work piece, an arrangement for achieving a relative motion between the work piece and the force applying means, position sensors between the work piece and the last mentioned arrangement for achieving a relative motion, and a control system for controlling the operation dependent on the data output by the position sensors and other data, which determine the location and magnitude of the compressive residual stresses to be induced. If the compressive residual stresses are to be induced or caused by means of a rolling operation, then the above mentioned force applying means include a force activated rolling tool with at least one rolling roller and an arrangement for controlling the rolling force. A rotational motion of the work piece causes the above mentioned relative motion between the roller and the work piece, whereby the necessary rolling process is carried out. Furthermore, there may be provided pass or displacement controlled movable carrier means for achieving an additional relative motion between the work piece and the rolling tool according to a predeterminable motion sequence and at predeterminable positions. A pass controlled carrier may be necessary, for example, for separate rolling tools to move the rolling roller of each rolling tool into a correct axial position and then to carry out a radial motion of the rolling tool to at least move the roller toward the work piece until it contacts the work piece. Then the rolling force control must provide the correct rolling force as well as the correct rolling force alternation or adjustment in order to achieve the desired straightening effect.

An apparatus for carrying out the method according to the invention may advantageously simultaneously include a deformation measurement system having at least one measuring element for determining the work piece out of true deformation at predetermined or predeterminable positions. The deformation measuring system is connected with a data evaluating arrangement, which in turn is connected to the machine control. In this manner, the condition or state of the work piece may be measured or tested directly in the straightening apparatus, whereby the straightening data are determined and, if necessary, constantly corrected.

In the apparatus according to the invention the arrangement or means for causing the compressive residual stresses in a work piece may comprise hardening means instead of the rolling arrangement as described above. Such hardening means or device, for example, an induction coil for heating the work piece, is used to harden a surface layer zone of the work piece. After the surface layer zone of the work piece is heated, the cooling or quenching necessary for achieving the required increase in hardness in the surface layer zone of the work piece can be a simple air cooling or alternatively may be achieved by means of a separate cooling system. The cooling requirements are dependent on the type of material the work piece is made of. This hardening device or means must be able to cause not only the absolute hardness, but also achieve a defined hardening depth of the hardened surface layer zone of the work piece. The technology of hardening a surface layer zone of a work piece is known as such and it is also known, which parameters must be varied in order to achieve an increased hardness in the surface layer zone or an increased or decreased hardening depth of the surface layer zone. Therefore, the hardening techniques will not be discussed in detail here.

The apparatus according to the invention further includes appropriate means for controlling the hardness as such, the hardening depth as well as the location of the hardening operation, in order to achieve an optimal straightening result according to the method of the invention.

BRIEF DESCRIPTION OF THE DRAWINGS

In order that the invention may be clearly understood, it will now be described, by way of example, with reference to the accompanying drawings, wherein:

FIGS. 6A and 6B show a flow chart depicting the process steps involved in straightening an out of true work piece according to the invention;

DETAILED DESCRIPTION OF PREFERRED EXAMPLE EMBODIMENTS AND OF THE BEST MODE OF THE INVENTION

Figure 1:
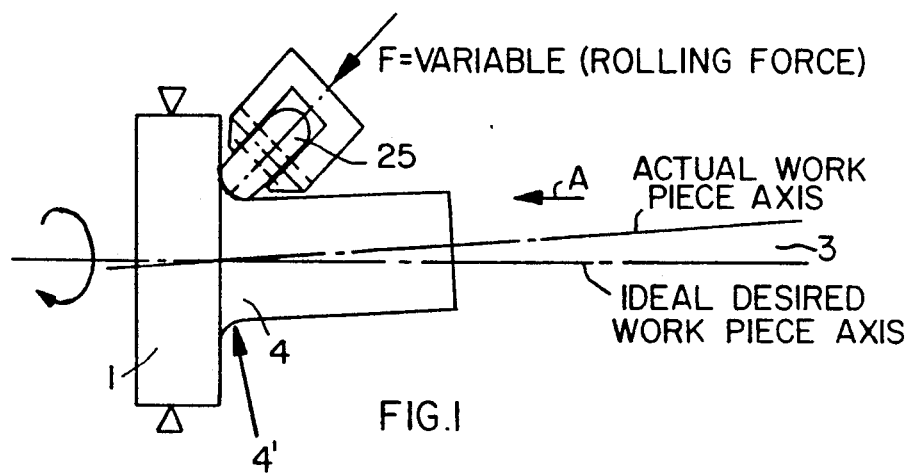
FIG. 1 is a schematic side view, an axle journal shaft exhibiting an out of true deformation to be straightened according to the method of the invention.
Figure 2:
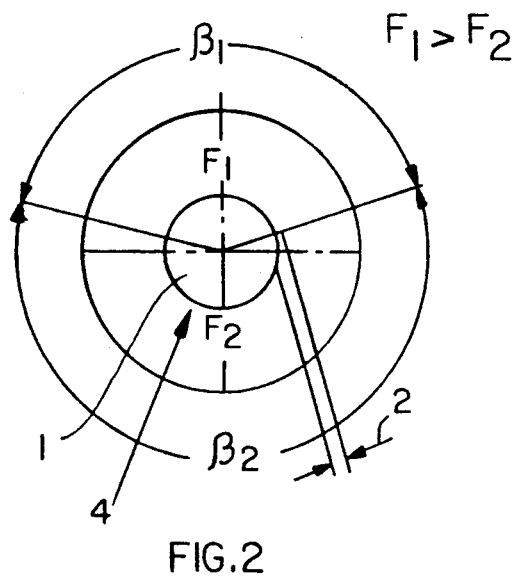
FIG. 2 is a schematic end view of the axle journal of FIG. 1 viewed in the direction of the arrow A in FIG. 1, but omitting the rolling tool.

As shown in the side view of FIG. 1 and the end view of FIG. 2 a work piece 1 is a simple stepped shaft such as the end portion of an axle journal, such as the journal or steering knuckle, which is typically used at the steered or front wheels of a motor vehicle. The work piece 1 has an out of true deformation 3 away from its ideal axially straight shape. The deformation 3 of the work piece 1 is to be straightened according to the invention, whereby in this example case, the deep rolling process is shown for inducing the necessary compressive residual stresses in the work piece 1. For this purpose a roller 25 is pressed against the notch or shoulder area 4' which is, for example, a transition concave fillet 4' of the circumferential surface 4. The roller 25 is loaded by the force F in the direction shown in FIG. 1 by the arrow F to press against the fillet 4' so that the effective direction of the force F passes through the center of the radius of curvature of the concave fillet 4'. The work piece 1 is rotated about its lengthwise axis and the force F is varied during each rotation of the work piece as shown more distinctly in FIG. 2. In order to achieve the necessary or desired compressive residual stresses, a force F1 is applied over the circumferential angular range $\beta 1$, whereas a smaller force F2 is applied over the circumferential angular range $\beta 2$. Here, the angular range $\beta 1$ extends on the side of the work piece 1 toward which the work piece is bent, while the angular range $\beta 2$ extends around the side of the work piece from which the work piece is bent away. Since the force F1 is greater than the force F2, greater compressive residual stresses are induced in a surface layer zone of the work piece 1 over the angular range $\beta 1$ than over the angular range $\beta 2$. Thus, the deformation 3 of the work piece 1 is at least reduced or even completely eliminated as the compressive stresses attempt to relax or become effective in the work piece. The forces are so selected that compressive residual stresses are induced only in a surface layer zone 2, see FIG. 2. Moreover, the force F2 which acts upon the angular range $\beta 2$ of the circumferential surface 4 may already be large enough that a sufficient rolling hardening effect is achieved to produce a desired increase in the fatigue strength of the work piece 1. However, in order to achieve the desired straightening effect, it is still necessary that the force F1 is sufficiently greater than the force F2. As the dimensions of the roller 25 remain the same, the forces F1 or F2 produce an exactly determined specific rolling force in a zone of the circumferential surface 4 of the work piece 1. In order to increase the compressive residual stresses in the surface layer zone 2 of the work piece 1, the specific rolling force applied by the roller 25 must be increased. Such an increase of the specific rolling force can be achieved in that, for example, the diameter of the roller 25 is reduced according to the rule of Hertzian surface compression or stress. With such a decreased roller diameter, an increased specific rolling force is achieved while the force F1 or F2 is respectively maintained the same as before for achieving a correspondingly increased compressive residual stress in the work piece 1 without increasing the depth of the surface layer zone 2 in which the compressive residual stresses are induced. If instead, the diameter of the roller 25 is maintained the same and the force F1 or F2 is respectively increased, then the specific rolling force is again increased and therewith an increased compressive residual stress is achieved in the work piece. However, in this case, the increased compressive residual stresses extend deeper into the surface layer zone 2 or rather the surface layer zone 2 becomes deeper.

However, it is also possible, while maintaining the same compressive residual stresses, to achieve an increased depth of the residual stresses or, in other words, to increase the depth of the surface layer zone 2 through which a corresponding compressive residual stress is effective. This can be achieved, in that the diameter of the roller 25 is increased and the force F1 or F2 is respectively increased until the originally provided specific rolling force is again achieved, or rather is maintained. In other words, the increased roller diameter and the increased applied force balance each other out to achieve the same specific rolling force. In this manner, the compressive residual stresses in the work piece also reach the originally provided values but to a greater depth or with an increased thickness of the surface layer zone 2.

Instead of the roller 25 a different hardening apparatus could be provided, for example, a hardening apparatus which uses a laser beam of an appropriate variable energy in order to locally heat and thereby harden the work piece. A hardening operation such as this laser heat hardening operation, carried out in the surface layer zone 2 of the work piece 1 in the same area 4' as described above for the operation of the roller 25, similarly achieves a corresponding increased compressive residual stress in the work piece and thereby achieves the desired straightening effect. The magnitude of the straightening effect can be influenced by the corresponding magnitude of the hardness as such and/or the penetration depth of the hardened surface layer zone 2. This is achieved for example by adjusting the power input to the laser or by varying the time of impingement of the laser beam on one location.

The hardening operation as well as the rolling operation for carrying out the straightening process according to the invention can be carried out on a work piece in which the areas in which the increased compressive residual stresses are to be induced have already been strengthened in a prior hardening or hard-rolling operation. In such a case it is simply necessary that the corresponding parameters for the following hardening operation or rolling operation, which is to achieve the desired straightening effect, are increased sufficiently, so that the compressive residual stresses in the desired areas of the work piece are actually increased over the initial level. The exact angular ranges, $\beta 1$ and $\beta 2$ over which the hardening or rolling operations are to be varied, can be determined by simple experiments.

Figure 4:
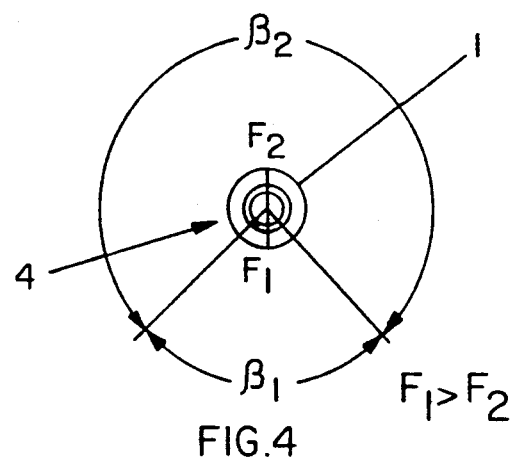
FIG. 4 is an end view of the bearing end portion of the crankshaft in the direction of the arrow B in FIG. 3.
Figure 3:
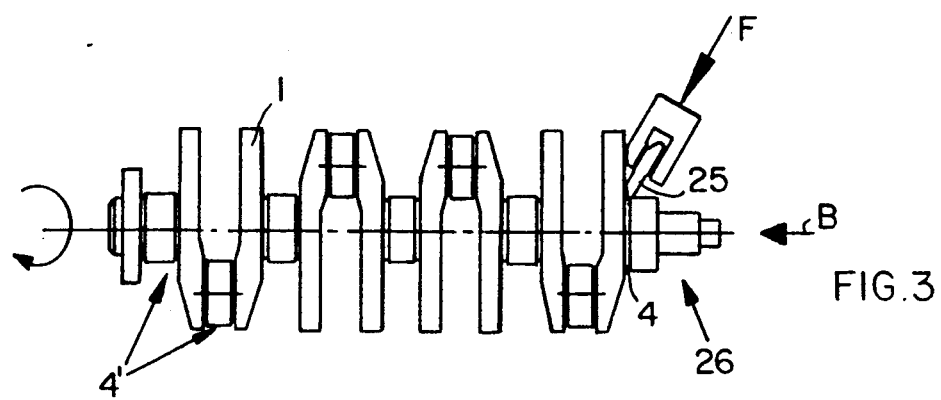
FIG. 3 is a schematic side view of a crankshaft which is to be straightened according to the invention.

As shown in the side view of FIG. 3 and the partial end view of FIG. 4 the above described method can advantageously be applied to a crankshaft work piece 1. The shaft end 26 of the crankshaft 1 is bent or out of true in a downward direction or in a direction opposite to the bending of the shaft end of the axle journal shown in FIG. 1. In the example embodiment shown in FIGS. 3 and 4, a deep rolling operation is carried out in order to straighten the shaft end 26 according to the invention. A roller 25 is again applied with a force F to a shoulder area 4' which may, for example, be a concave fillet 4'. A rolling force F1 is applied over an angular range $\beta 1$ and a smaller rolling force F2 is applied over an angular range $\beta 2$. Insofar as the entire shoulder area 4' of the crankshaft 1 has already been previously subjected to a deep rolling operation, the force F1 must be correspondingly increased above the force applied for the deep rolling operation, which is equal to or which is provided by the force F2 applied over the angular range $\beta 2$. Furthermore, a corresponding hardening operation may be substituted for the rolling operation described here in a manner similar to that described above, with reference to FIGS. 1 and 2.

Figure 5:
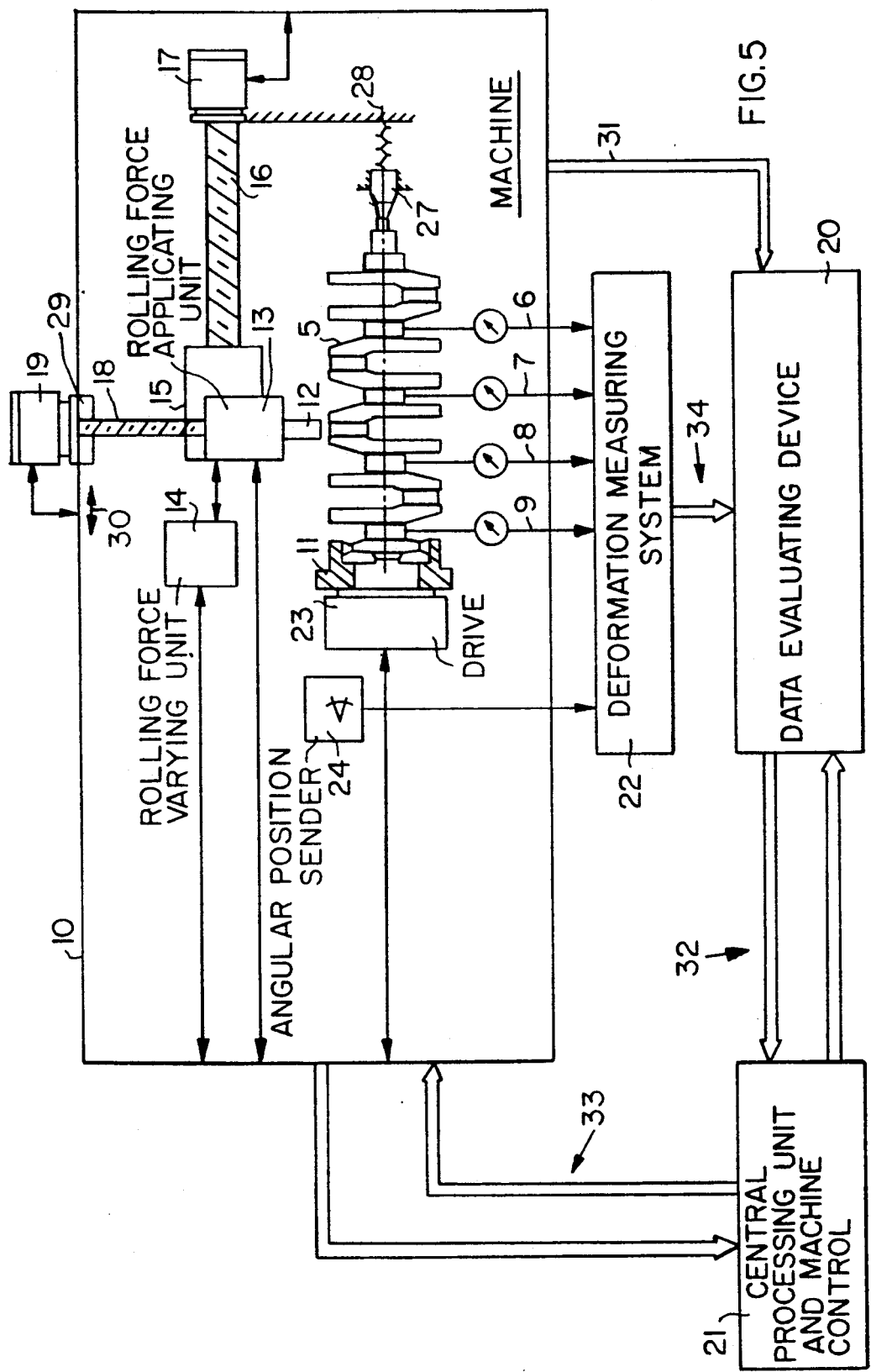
FIG. 5 is a schematic diagram of a machine tool or system for carrying out the method according to the invention.

FIG. 5 shows schematically a machine tool system for performing the method of the invention. A machine base 10 includes a work piece rotational drive 23 with a work piece clamping device or chuck 11. A work piece 5, which is, for example, shown as a crankshaft 5, is held between the clamping device 11 and a dead center point 27. The rotational angular position of the work piece drive 23 and therewith the angular position of the work piece 5 is monitored by an angular position sender or sensor 24 which transmits a signal to a deformation measurement system 22. In this context, it must simply be assured, that the crankshaft work piece 5 is installed or held in the work piece clamping device 11 with a known predetermined rotational angular position relative to the clamping device 11.

The deformation measuring system 22, Model 19010IC, plus one Model 19002IC for each measuring station, make Feinpruef GmbH for example, includes measuring stations 6, 7, 8, and 9 Model 4300, make Feinpruef GmbH. Each measuring station 6 to 9 includes a measuring device arranged at an appropriate location of the crankshaft 5, for example, at each of the main bearing journals of the crankshaft as shown in FIG. 5, to measure the out of true deviation of the crankshaft 5. More specifically, the magnitude of any radially directed out of true deformation is measured. The measuring stations 6 to 9 transmit a signal corresponding to the measured information to the deformation measuring system 22, which in conjunction with the information transmitted by the angular position sender 24 is able to determine the rotational angular position of the measured out of true deformations of the work piece 5 at the measured locations.

A rolling tool 12 is arranged to apply a rolling treatment to the work piece 5 according to the method of the invention. A rolling force application unit 13 is operatively connected to the rolling tool 12 so as to apply an appropriate rolling force. The rolling tool 12 and the force application unit 13, are generally known in the art and hence will not be more closely described.

The rolling force application unit 13 is arranged on a carrier 15 e.g. European Application No. 86,100,404.2 and can be driven by the carrier 15 in the direction of the work piece axis 28, for example, by means of a ball worm spindle 16 with an associated spindle drive 17. The spindle drive 17 has a rotational position indicator which gives information corresponding to the respective position of the carrier 15, whereby the carrier 15 may be correctly positioned. The rolling force applying unit 13 may also be arranged in a stationary manner, if the rolling operation is always to be carried out at the same axial position or location of the work piece. Thus, it is also possible to arrange a plurality of stationary force applying units at the respective desired axial rolling location.

The rolling force applying unit 13 in turn is driveable in a radial direction perpendicular to the work piece axis 28 by means of the ball worm spindle 18 with an associated spindle drive 19. In order to allow a simultaneous axial and radial motion of the force applying unit 13, and thus of the rolling tool 12, the spindle drive 19 is arranged on a carriage 29, which is movable in the direction shown by arrow 30. Just as for the spindle drive 17, the spindle drive 19 also has a rotational position indicator for indicating the radial position of the rolling force applying unit 13 with the rolling tool 12 for allowing the accurate radial positioning of the rolling tool 12.

The data from the measuring stations 6 to 9 and from the angular position sender 24 are transmitted by the deformation measuring system 22 to a data evaluating device or circuit 20 through a data channel or bus 34. The rotational position indicators, which cooperate with the spindle drives 17 and 19, but which are not shown or referenced in detail, provide data regarding the respective momentary position of the rolling force applying unit 13 and the carrier 15 to the data evaluating device 20 through the data bus 31.

The rolling force applying unit 13 is connected to a rolling force control unit of varying unit 14 servo valves. Model 4WS2EMTO-4X/20B2T315Z8 D/M, amplifiers for servo valves VT1600-S31 Rexroth GmbH in order to control or adjust the rolling force. If necessary, the rolling force can even be varied by means of the rolling force control unit 14 during the course of any single rotation of the work piece. Such a variation of the rolling force during each rotation of the work piece is often or even usually necessary as described above with reference to FIGS. 1 to 4.

The data evaluating device 20 receives data from and transmits data to a machine control 21 via a data bus 32. The machine control 21 is a central processing unit which, in conjunction with the data evaluating device 20 controls the operation of the entire machine with regard to the position of the separate components as well as regarding the rotational speed, the number of rolling passes, the rolling force and rolling force variations, and the succession of locations to be straightened. The data evaluating device 20 may include a computer which may be freely programmable. A computer Model SMP-BUS system, manufactured by Siemens is suitable for the present purposes. In this manner, it is possible to perform various pre-programmed straightening procedures. In special cases, when the state of the work piece in the machine has been determined or is otherwise known, a specially programmed straightening operation may be performed corresponding to the respective state or condition of the current work piece. The control of the machine by the machine control or CPU 21 Siemens SIMATIK S5-150U and SINUMERIK 850T is achieved through the data buses 32, 33, 31, and 34. While the data buses 32 and 33 allow transferring data in both directions, the data buses 31 and 34 only supply data to the data evaluating device 20 and do not allow transmission of data from the data evaluating device 20. The separate data connections, data flow directions and movement directions between the various components of the machine 10 and the peripheral control devices 20, 21, and 22 are merely schematically indicated by thin arrow lines in FIG. 5, whereby the outer schematic boundary of the machine 10 also represents a data transmission connection.

The apparatus according to the invention may include a plurality of independent units, or may represent a single contained machine. For example, the deformation measuring system may as such be an independent unit arranged to cooperate with an independent and separate straightening unit. This straightening unit may be embodied as a rolling machine as described above or alternatively as a hardening machine. Separate from the independent units mentioned here, a further independent hardening machine or rolling machine may be arranged to achieve a desired strength characteristic of the work piece prior to the straightening operation. Such a prehardening or prestrengthening operation should be carried out prior to or arranged ahead of the deformation measuring system, because the pre-strengthening hardening operation or rolling operation is expected to cause a deformation of the work piece which should be measured to then be trued or straightened.

Figure 6B:
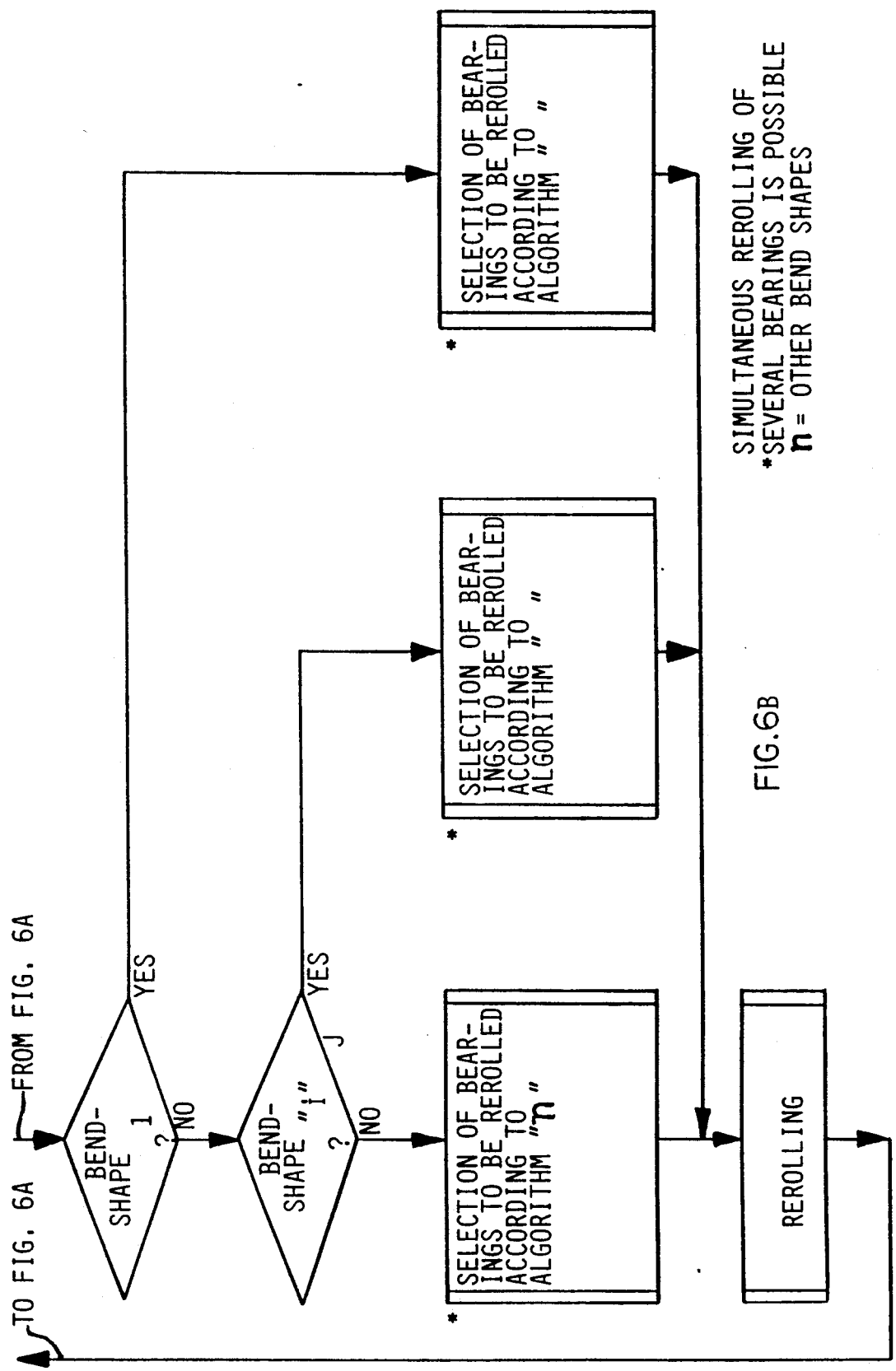

FIGS. 6A and 6B show a flow chart representing an example sequence of steps in the method according to the invention. The various successive method steps may, for example, be programmed in the machine control central processing unit 21 and carried out by means of the apparatus described above, to true or straighten a work piece such as a shaft.

As shown in FIGS. 6A and 6B, a shaft work piece is first subjected to a pre-machining step, such as a deep rolling operation. This machining may cause an undesirable out of true deformation in the work piece. In the next step any out of true deformation is measured and is subsequently evaluated. If the evaluated deformation falls within an allowable tolerance range, then the shaft is "good" and requires no further treatment. If, however, the out of true deformation is unacceptably large, then the shaft is "bad" and will be further analyzed and/or processed.

If the deformation is too large to be effectively trued or straightened, then the shaft is rejected for remachining or as scrap. If, instead, the deformation is not excessively large, then the shaft is passed onto a bend-shape analysis of the out of true deformation. The shaft may comprise several bend deformations, for example, it may be deformed separately at each bearing journal area. The deformation bend shape at each bearing journal is determined as a closest fit to one of a number of pre-programmed bend shapes defined by algorisms "n", or "i", or "1". Any measured bend deformation matching the pre-programmed first shape corresponding to algorism "1" is selected for treatment, such as a rolling operation according to a corresponding first rolling algorism "1". Any bend deformation of an ith or nth shape is similarly selected for treatment according to an ith or nth rolling algorism. Each rolling algorism specifies a rolling force, number of rolling passes, location of rolling passes, rolling area boundaries, roller diameter, etc. appropriate for straightening the corresponding deformation. The rolling algorism data are stored in and executed by the machine control or CPU 21.

After the necessary rolling operations have been carried out, the shaft work piece is returned to the initial measuring step in order to measure any out of true deformation which may still exist. If necessary, the analysis and any necessary treatment is repeated as described above, until the work piece has been straightened sufficiently to be within an acceptable tolerance range as a "good" shaft.

Figure 7:
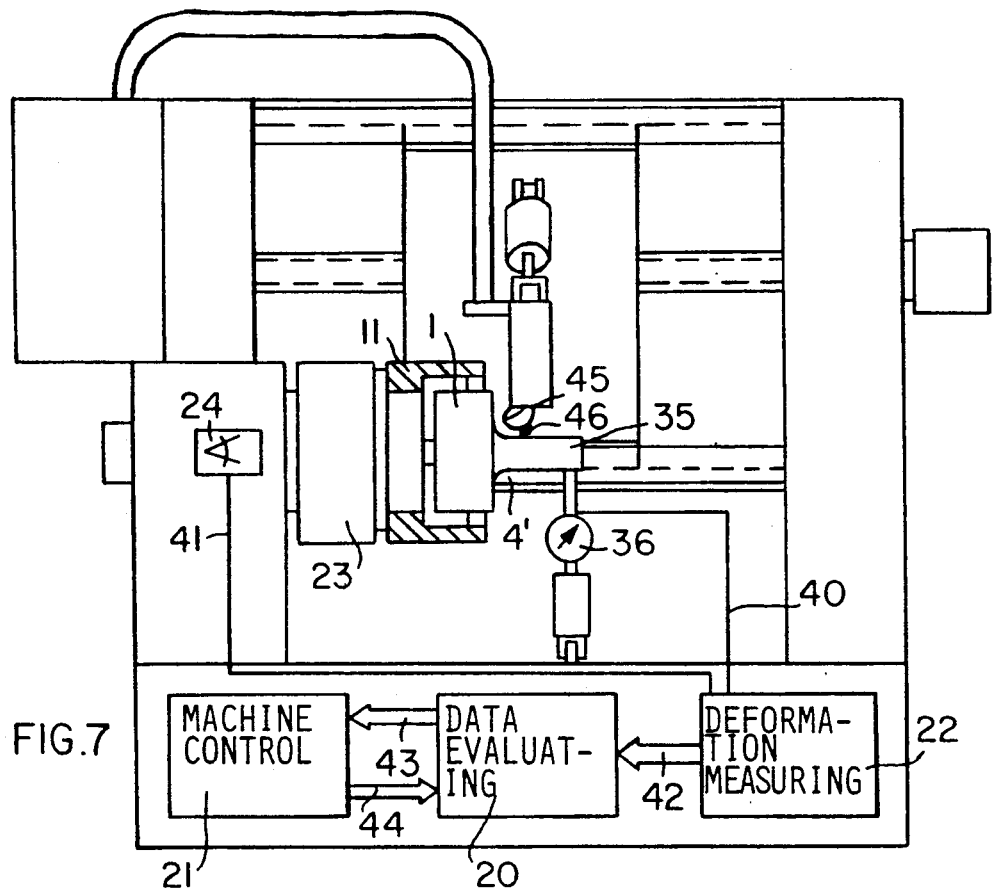
FIG. 7 is a front view of an apparatus for hardening a work piece.
Figure 8:
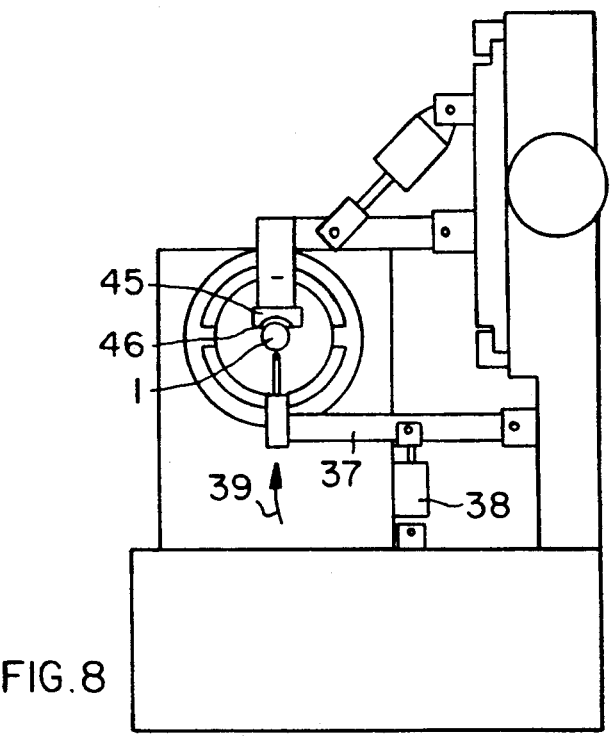
FIG. 8 is an end view of the apparatus of FIG. 7.

In FIGS. 7 and 8 a machine is shown which is constructed for increasing the fatigue strength of a work piece by hardening while avoiding or removing a possible out-of-round (or imbalance) occurring on a work piece journal. The rotational drive 23 holds a work piece 1 as shown in FIG. 1 with the work piece clamping device 11 for applying compression stress in the fillet 4' by applying a hardening method.

The machining (or operational) sequence shall be described in the following. The work piece 1 clamped by the clamping device 11 is being rotated by the rotational drive 23. In order to determine at the beginning of the work piece treatment whether or not the journal 35 has an imbalance, a measuring sensor 36, mounted on a lever 37, is tilted in the direction of the arrow 39 into a working position on the work piece 1 with the aid of the flow means cylinder 38. Any imbalance present is measured by the measuring sensor 36 and the imbalance size is transmitted to the deformation measuring system 22 through a conductor 40. The deformation measuring system 22 ascertains through the conductor 41 in connection with the angle sensor 24 the corresponding angular position of the measured imbalance. The data ascertained by the measuring sensor 36 and by the angle sensor 24 are supplied to the data evaluating device 20 through the conductor 42. The data evaluating device 20 cooperated with the machine control 21 through conductors 43 and 44 by exchanging data. Based on the measured data, the machining data are controlled in closed loop fashion depending on the angle and in accordance with the software entered into the control 21, so that the internal (eigen) stresses produced in the work piece by hardening increase the fatigue strength of the work piece, while simultaneously making the present imbalance smaller, so that the imbalance is within a permissible tolerance range. The parameter to be controlled in closed loop fashion may be the current, the voltage, the gap 46 between the induction coil 45 and the work piece 1, the cooling of the heated work piece 1, and the combination of these parameters at least partially. For example, during the heating of the work piece the induction coil 45 is positioned with a defined minimal spacing from the work piece 1 in certain angular positions of the work piece 1 while being positioned at a larger spacing from the work piece 1 through the remaining work piece circumference. This operation is repeated as often as necessary until the desired temperature distribution on the work piece 1 has been reached. Thereafter, the work piece 1 is being cooled for the hardening and thus the operation for increasing the fatigue strength while taking into account the journal imbalance is completed.

Although the invention has been described with reference to specific example embodiments, it will be appreciated, that it is intended to cover all modifications and equivalents within the scope of the appended claims.

What I claim is:

1. A method for straightening a work piece having cross-sections along its length with fillets forming transition areas between neighboring cross-sections, said cross-sections having a work piece diameter (D1), said work piece having a rotational axis and a bend relative to said rotational axis, said bend being determined by three values, namely as to its location by an axial coordinate value, as to its direction by an angular coordinate value, and as to its size by an eccentricity magnitude value, comprising the following steps:

(a) first introducing into said fillets of said work piece first residual compressive stresses in a complete circumferential surface layer for increasing a fatigue strength of said work piece,
   (b) determining from said three values a respective control signal which represents a circumferentially limited angular range ($\beta 1$) within about 5° to about 160° around a portion of at least one of said fillets requiring the introduction of further residual compressive stress for said straightening, and
   (c) second introducing additive second residual compressive stresses in response to said control signal, for adding said second residual compressive stresses to said first residual compressive stresses only in said range ($\beta 1$) of said surface layer zone, by a rolling tool having a diameter (D2) substantially smaller than said work piece diameter (D1) by applying to said rolling tool a straightening force only in said limited angular range ($\beta 1$) of said surface layer zone of said at least one fillet to introduce said second additive residual compressive stresses only to a radial depth (D3) short of a depth where said second residual compressive stresses tend to become subtractive, for increasing said first residual compressive stresses by said second residual compressive stresses only in said limited angular range ($\beta 1$) of said surface layer, thereby avoiding reducing said fatigue strength and simultaneously reducing or eliminating said bend.

2. The method of claim 1, wherein said angular range ($\beta 1$) is 75° to 105°.

3. The method of claim 1, wherein said radial depth (D3) is within the range of 0.1 mm to 1.0 mm.

4. The method of claim 1, wherein said straightening force is radially directed.

5. The method of claim 1, wherein said straightening force is within the range of 500 to 2000 Kp.

6. The method of claim 1, wherein said diameter (D2) of said rolling tool is within the range of 0.25 to 0.35 times said diameter (D1) of said work piece.

7. The method of claim 1, comprising imparting relative rotation between said work piece and said rolling tool for performing a deep rolling operation which applies said straightening force for introducing said second residual compressive stresses only in said limited angular range ($\beta 1$).

8. The method of claim 7, wherein said deep rolling operation for said hardening is controlled by adjusting at least one of the following parameters: a specific rolling force, an absolute rolling force, a number of rolling passes, a rolling pass speed, and a drive current magnitude for said rolling tool.

9. The method of claim 7, wherein said relative rotation between said work piece and said rolling tool is an oscillatory relative rotation within said limited angular range ($\beta 1$).

10. The method of claim 7, wherein said relative rotation between said work piece and said rolling tool comprises rotating said work piece relative to said rolling tool with full 360° revolutions and driving said rolling tool against said work piece only when said limited angular range ($\beta 1$) is facing said rolling tool.

11. The method of claim 7, comprising repeating an engagement between said work piece and said rolling tool in said limited angular range one to ten times.

12. The method of claim 1, wherein said straightening force applied in said limited angular range ($\beta 1$) is larger than a rolling force applied in said complete circumferential surface layer outside said limited angular range ($\beta 1$).

13. The method of claim 1, comprising introducing said first residual compressive stresses into said work piece by a preliminary fatigue strength increasing operation.

14. The method of claim 1, comprising introducing said first and second residual compressive stresses in a single machine tool sequentially in response to a program, whereby moving said work piece from one machine tool to another is avoided.

15. The method of claim 1, further comprising testing at least a random nun%her of not yet straightened sample work pieces to determine correction values from which said control signal is formed, based on said eccentricity magnitude and on said angular coordinate value which determines a direction of said bend in an initial state of said work piece, and controlling said second introducing of said additive second compressive stresses in response to said control signal including said correction values.

16. The method of claim 15, comprising straightening a series of similar work pieces without changing said controlling.

17. The method of claim 1, further comprising testing a work piece after said second introducing step has been performed by a rolling operation to measure at least said eccentric magnitude and said angular coordinate which determines a direction of said bend for providing further correction values for correcting said control signal, and performing a further straightening rolling operation under the control of said further correction values, and repeating said testing and straightening operation until said bend is reduced to an acceptably small level.

18. The method of claim 17, comprising performing more than two sequential straightening operations on the work piece, each straightening operation being performed with a different adjustment correction value which is constant during the respective straightening operation.

19. The method of claim 1, further comprising testing said work piece at a plurality of locations along said work piece length for ascertaining the largest bend, and then performing said first introducing first at a location of said largest bend.

20. The method of claim 1, comprising introducing said first and second residual compressive stresses with the same rolling tool substantially simultaneously in that said rolling tool engages said work piece with a first rolling force outside said limited angular range ($\beta 1$) and with a second rolling force inside said limited angular range ($\beta 1$), said second rolling force being larger than said first rolling force.

* * * * *

UNITED STATES PATENT AND TRADEMARK OFFICE
CERTIFICATE OF CORRECTION

PATENT NO. : 5,333,480

DATED : Aug. 2, 1994

INVENTOR(S) : Garri Berstein

It is certified that error appears in the above-identified patent and that said Letters Patent is hereby corrected as shown below:

Column 16, line 66, replace "nun%her" by --number--.

Signed and Sealed this

Eighteenth Day of October, 1994

Attest:

BRUCE LEHMAN

*Attesting Officer*    *Commissioner of Patents and Trademarks*